(12) United States Patent
Irons

(10) Patent No.: US 9,668,457 B1
(45) Date of Patent: Jun. 6, 2017

(54) DISJOINABLE LOOP TO DROP WASTE

(71) Applicant: Michelle Irons, Brooklyn, NY (US)

(72) Inventor: Michelle Irons, Brooklyn, NY (US)

( * ) Notice: Subject to any disclaimer, the term of this patent is extended or adjusted under 35 U.S.C. 154(b) by 0 days.

(21) Appl. No.: 15/226,138

(22) Filed: Aug. 2, 2016

(51) Int. Cl.
*A01K 29/00* (2006.01)
*A01K 23/00* (2006.01)

(52) U.S. Cl.
CPC .................................. *A01K 23/005* (2013.01)

(58) Field of Classification Search
CPC .................................................... A01K 23/005
USPC ...... 294/1.3, 1.4, 1.5, 209, 214; 248/99, 101
See application file for complete search history.

(56) References Cited

U.S. PATENT DOCUMENTS

| | | | | |
|---|---|---|---|---|
| 1,468,709 | A * | 9/1923 | La Grandeur | B65B 67/1255 24/565 |
| 3,527,492 | A * | 9/1970 | Hollis | E01H 1/12 294/115 |
| 4,003,595 | A | 1/1977 | Fano et al. | |
| 4,010,970 | A * | 3/1977 | Campbell | A01K 23/005 294/1.5 |
| 4,135,750 | A | 1/1979 | Rosin | |
| 4,319,726 | A * | 3/1982 | Andersson | B65B 67/12 171/43 |
| 4,335,678 | A | 6/1982 | Garza et al. | |
| 4,363,508 | A | 12/1982 | Duke | |
| 4,368,907 | A | 1/1983 | Ross | |
| 5,577,785 | A * | 11/1996 | Traber | B25J 1/04 294/100 |
| 5,590,923 | A * | 1/1997 | Berger | B25J 1/04 294/116 |
| 6,039,370 | A * | 3/2000 | Dooley, Jr. | A01K 23/005 248/99 |
| 6,257,634 | B1 | 7/2001 | Wei | |
| 6,305,322 | B1 | 10/2001 | Patel | |
| 6,983,966 | B2 | 1/2006 | Azrikam | |
| 7,232,165 | B2 | 6/2007 | Zelon | |
| 7,431,361 | B2 * | 10/2008 | Pilas | A01K 23/005 294/1.5 |
| 7,789,441 | B1 * | 9/2010 | Conway | E01H 1/1206 294/1.3 |
| 8,146,967 | B1 * | 4/2012 | Brown | A01K 23/005 294/1.5 |
| 8,177,270 | B2 | 5/2012 | Chen | |
| 8,684,429 | B1 | 4/2014 | Holub | |
| 2002/0130522 | A1* | 9/2002 | Asazuma | A01K 23/005 294/1.3 |
| 2005/0184540 | A1 | 8/2005 | Graziosi | |
| 2009/0152884 | A1* | 6/2009 | Ruscil | B65G 7/12 294/1.5 |

(Continued)

*Primary Examiner* — Paul T Chin
(74) *Attorney, Agent, or Firm* — Michael J. Feigin, Esq.; Feigin & Fridman

(57) ABSTRACT

A disjoinable loop is disclosed. The loop is curvilinear with a flat side, the flat side being separable from itself to disjoin the loop. On the other side of the disjoinable flat side are flanges which are mechanically connected to, and operable by, a switch which causes the loop to either join or become disjoined. In some embodiments, the default position is to have a joined loop, while in others the default position is to have a disjoined loop. An extension arm separates the switch from the loop. A bag placed over the loop is used to catch excrement falling from an animal and, upon joining the loop together, the bag falls from the loop. In this manner, one can easily collect pet or other waste into a bag.

10 Claims, 4 Drawing Sheets

(56) References Cited

U.S. PATENT DOCUMENTS

2012/0223537 A1 9/2012 Yip et al.
2014/0062109 A1* 3/2014 Olivera ................ A01K 23/005
294/1.5

* cited by examiner

DISJOINABLE LOOP TO DROP WASTE

FIELD OF THE DISCLOSED TECHNOLOGY

The disclosed technology relates generally to waste bags and, more specifically, a device with a disjoinable loop.

BACKGROUND OF THE DISCLOSED TECHNOLOGY

Picking up after your pet is common courtesy in many places and the law in others. Typically, one uses a bag or paper towel of sorts and manually picks up the waste, puts it in a disposable bag, and throws it on to the garbage. Not only does this necessitate bending over, but the method is unsanitary. What is needed is a way to eliminate these disadvantages.

SUMMARY OF THE DISCLOSED TECHNOLOGY

A disjoinable loop of embodiments of the disclosed technology has two configurations. In a first configuration, a loop is substantially closed, or fully closed, and fixedly connected at two distinct and separate points to flanges. The flanges fixedly attach to an arm, the arm having a handle with a switch at an opposite end from the loop.

In a second configuration, the loop is disjoined from itself, and the two distinct and separate points are moved apart from each other. Depression of the switch causes the loop to change from the first configuration to the second configuration or vice versa, depending on the embodiment.

The disjoinable loop can be used with a bag, the bag extending over the loop, or at least over most of it. When the loop is disjoined or joined, the bag falls due to gravitational forces and the lower frictional resistance of the loops and/or movement of the loop. Depressing or releasing the switch, in embodiments, causes a bag held by the loop to fall from the loop.

A majority of the loop is curvilinear and a minority is flat, in embodiments of the disclosed technology. The flat portion can be made of a first and a second flat region which are adjacent to each other in the first (joined) configuration, and disjoined from each other in the second configuration. The first flat region is fixedly connected to a first of the two distinct and separate points of the flanges, and the second flat region is fixedly connected to a second of the two distinct and separate points of the flanges, in embodiments of the disclosed technology.

When disjoining the loop, a first end of the first and second flanges remains in place (or substantially so) relative to the arm, in embodiments of the disclosed technology. Meanwhile, a second end of the first and second flanges, opposite the first end, separate from each other when the disjoinable loop changes from the first configuration to the second configuration.

The disjoinable loop, described above or otherwise, can be used as follows. One extends a bag over the loop, the loop being fixedly connected to two support flanges. These two support flanges are, in turn, fixedly connected to an arm at a side opposite the side attached to the loop. The arm further has a switch at a side opposite a side attached to the two support flanges. Depressing or releasing the switch causes the loop to become disjoined and the bag to fall from the loop.

When the loop becomes disjoined, the support flanges separate from each other, in embodiments of the disclosed technology. The support flanges can be fixedly connected to flat regions of the loop. The flat regions become spaced apart upon the loop becoming disjoined, in embodiments.

Describing further the above and/or other embodiments of the disclosed technology, a switch is mechanically coupled to two flanges through an arm, the switch operable to separate the two flanges. The two flanges are fixedly connected to either end of an openable loop that can be opened, such that operation of the switch causes the loop to open or close. Such a loop can have two flat regions which are separated when the loop opens and/or connects to the flanges.

"Substantially" and "substantially shown," for purposes of this specification, are defined as "at least 90%," or as otherwise indicated. "Identical" or "exactly," for purposes of this specification, is defined as "within an acceptable tolerance level known in the art." Any device may "comprise," or "consist of," the devices mentioned there-in, as limited by the claims. Any element described may be one of "exactly" or "substantially," as described.

It should be understood that the use of "and/or" is defined inclusively, such that the term "a and/or b" should be read to include the sets: "a and b," "a or b," "a," or "b."

DETAILED DESCRIPTION OF EMBODIMENTS OF THE DISCLOSED TECHNOLOGY

A disjoinable loop is disclosed. The loop is curvilinear with a flat side, the flat side being separable from itself to disjoin the loop. On the other side of the disjoinable flat side are flanges which are mechanically connected to, and operable by, a switch which causes the loop to either join or become disjoined. In some embodiments, the default position is to have a joined loop, while in others the default position is to have a disjoined loop. An extension arm separates the switch from the loop. A bag placed over the loop is used to catch excrement falling from an animal and, upon joining the loop together, the bag falls from the loop. In this manner, one can easily collect pet or other waste into a bag.

Embodiments of the disclosed technology will become clearer, in view of the forthcoming description of the figures.

Figure 1:
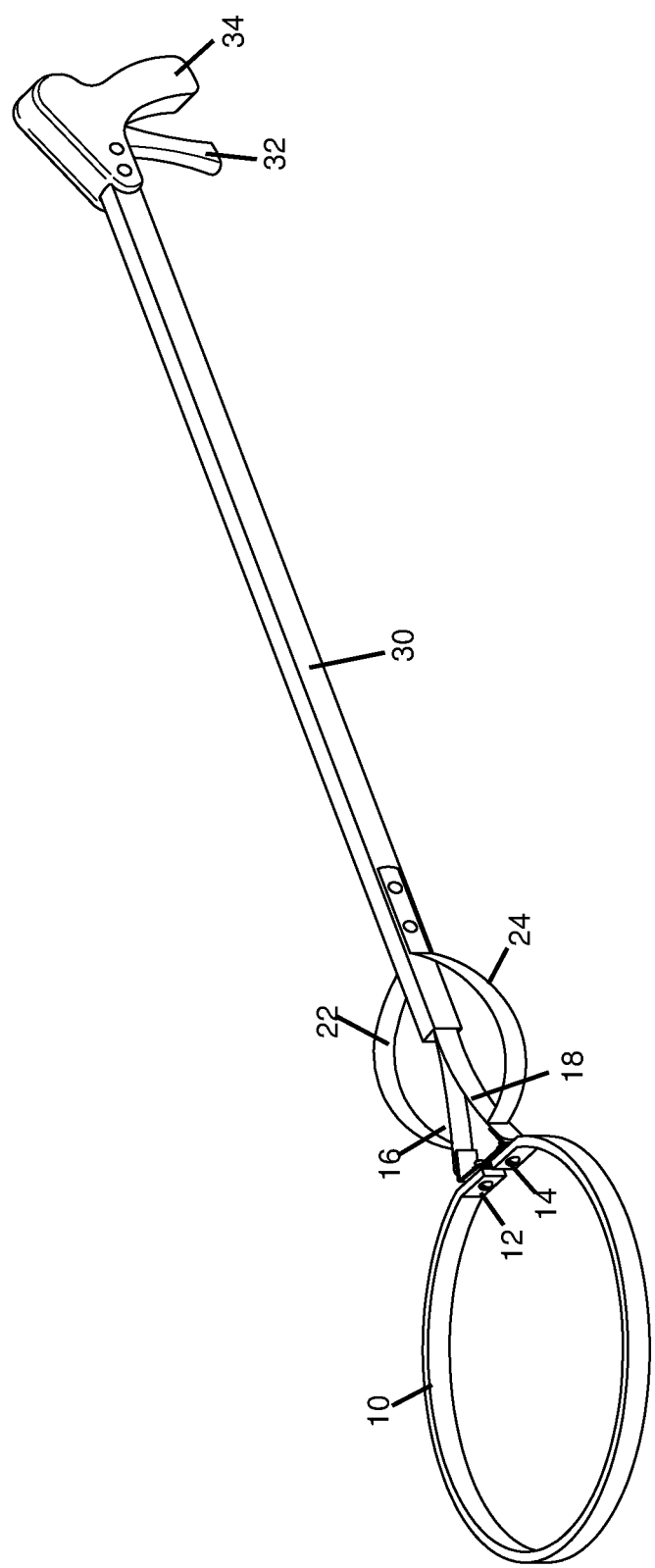
FIG. 1 shows the disjoinable loop with trigger switch, in a closed embodiment of the disclosed technology.

FIG. 1 shows the disjoinable loop with trigger switch, in a closed embodiment of the disclosed technology. The loop 10 is mostly or fully curvilinear and continuous. Either end of the loop (when disconnected) or adjacent portions of the loop (when connected) are fixedly attached to support flanges. In the embodiment shown in FIG. 1, this refers to flat regions 12 and 14 of the loop, the flat regions forming a minority of the loop, which are fixedly and respectively connected to flanges 16 and 18. The flanges 16 and 18 are further structurally supported by, and/or provided with, tension pushing the flanges 16 and 18 together, by external respective flanges 22 and 24.

The support arm 30 extends between the flanges 16 and 18 and a handle 34 with switch 32. The handle 34 and switch 32 are at opposite ends of the arm 30, compared to the support flanges 16 and 18. For purposes of this disclosure, "opposite ends" is defined as "spaced apart from each other, such that one item is nearest to a first extreme end thereof, and the other item is nearest to a second extreme end furthest from the first extreme end." The flanges 16 and 18 can extend through the support arm 30 to the switch 32, or otherwise be mechanically coupled thereto, such that when one depresses (or in other embodiments, releases) the switch 32, the flanges 16 and 18 separate from each other, causing the loop 10 to separate and grow in circumference. This separation occurs between flat regions 12 and 14, in embodiments of the disclosed technology.

Figure 2:
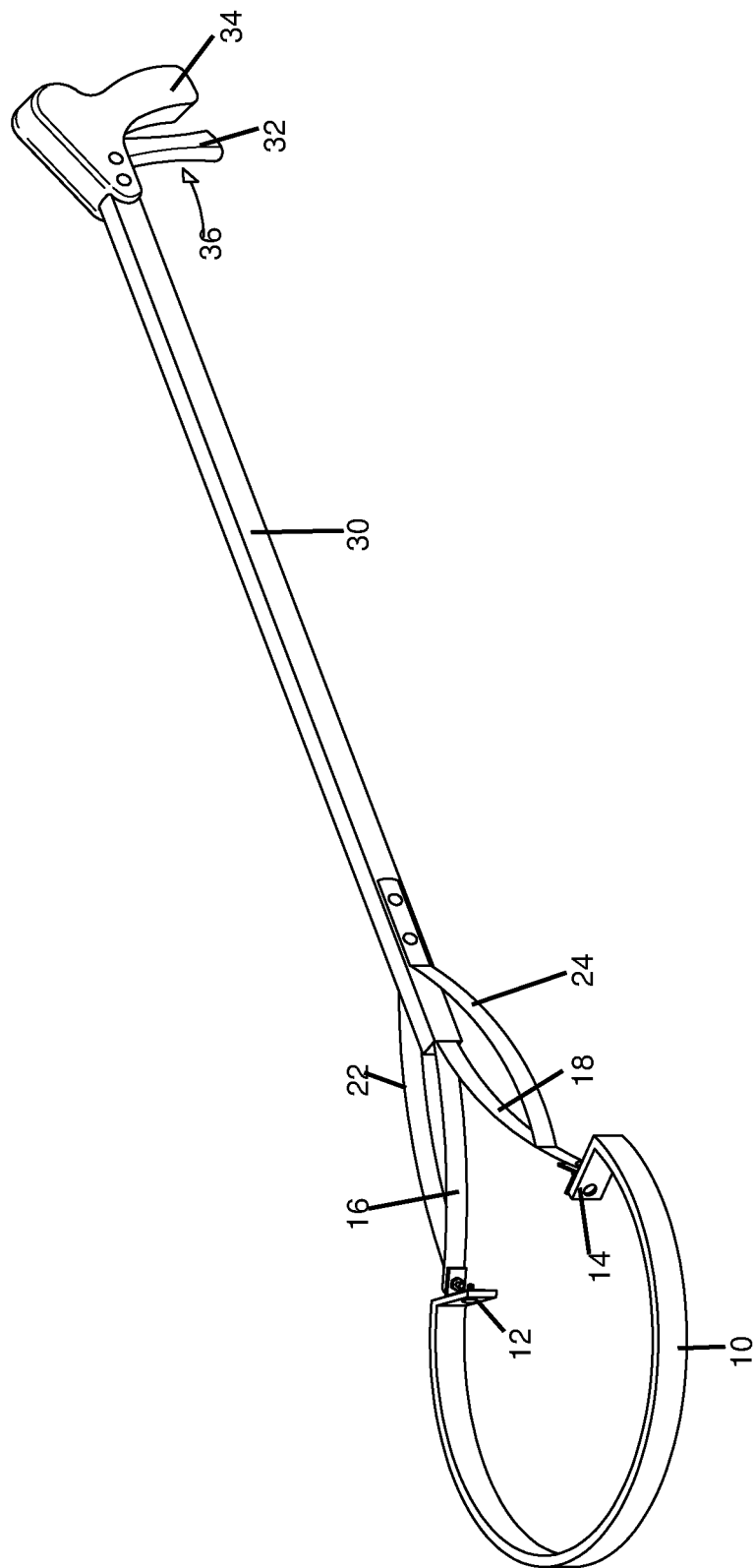
FIG. 2 shows the disjoinable loop with trigger switch in an open embodiment of the disclosed technology.

FIG. 2 shows the disjoinable loop with trigger switch, in an open embodiment of the disclosed technology. Here, one has depressed switch 32 by pushing the switch in direction 36, causing the loop 10 to grow in circumference, expand, and/or become disjoined. The flanges 16 and 18 are pressed outwards from the arm 30 and separate.

Figure 3:
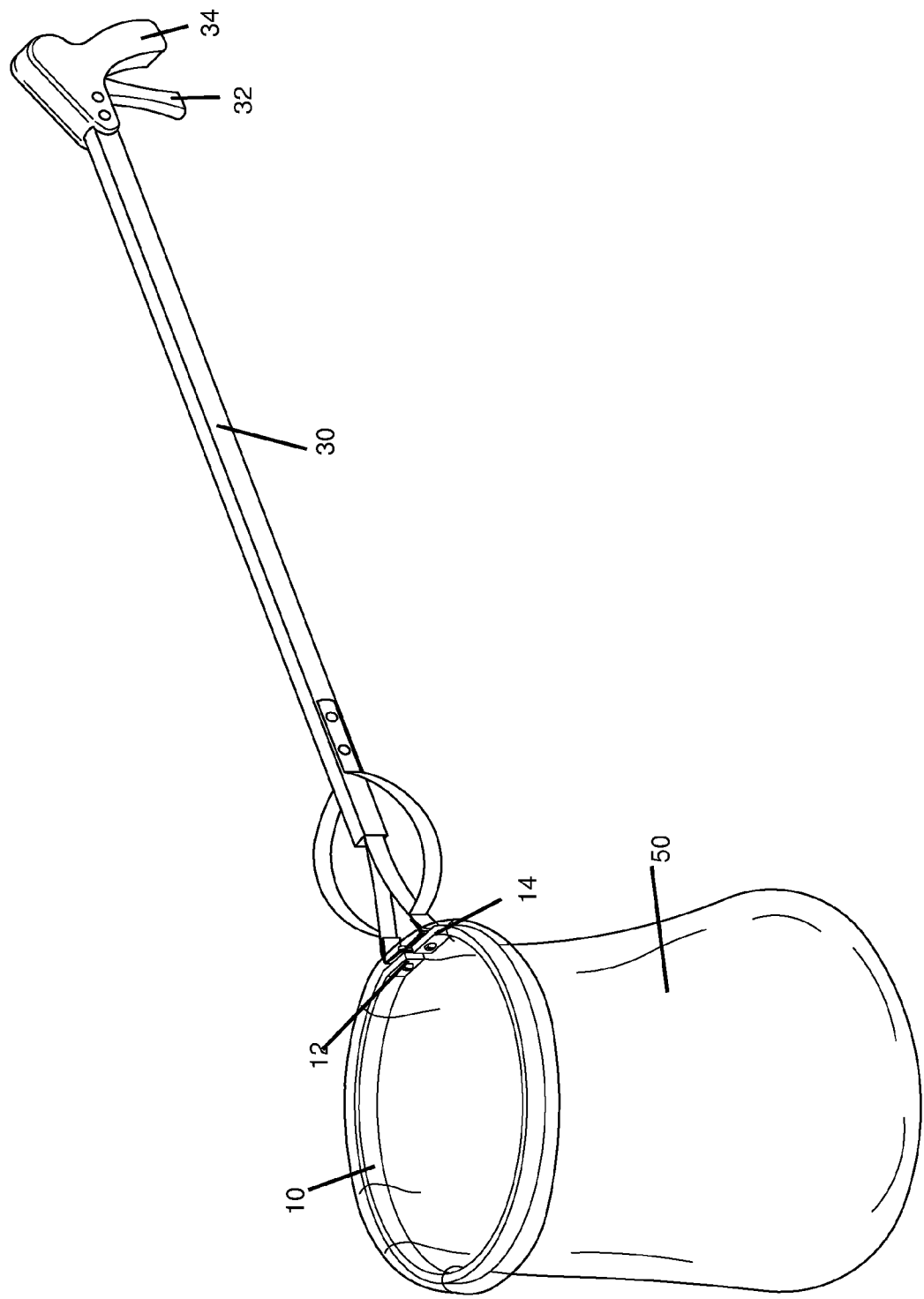
FIG. 3 shows a version of the disjoinable loop with trigger of FIGS. 1 and 2, with a bag attached to the loop.

FIG. 3 shows a version of the disjoinable loop with trigger of FIGS. 1 and 2, with a bag attached to the loop. A bag 50 is attached to the loop 10 by draping or extending the bag over the loop. This can be accomplished by placing the bag in the loop, and taking the edges of the opening of the bag and placing them over the top of the loop. Frictional forces are enough to hold the bag in place, in embodiments of the disclosed technology. The bag can be placed just over the top of the loop 10, or also wrapped around the sides of the loop.

Figure 4:
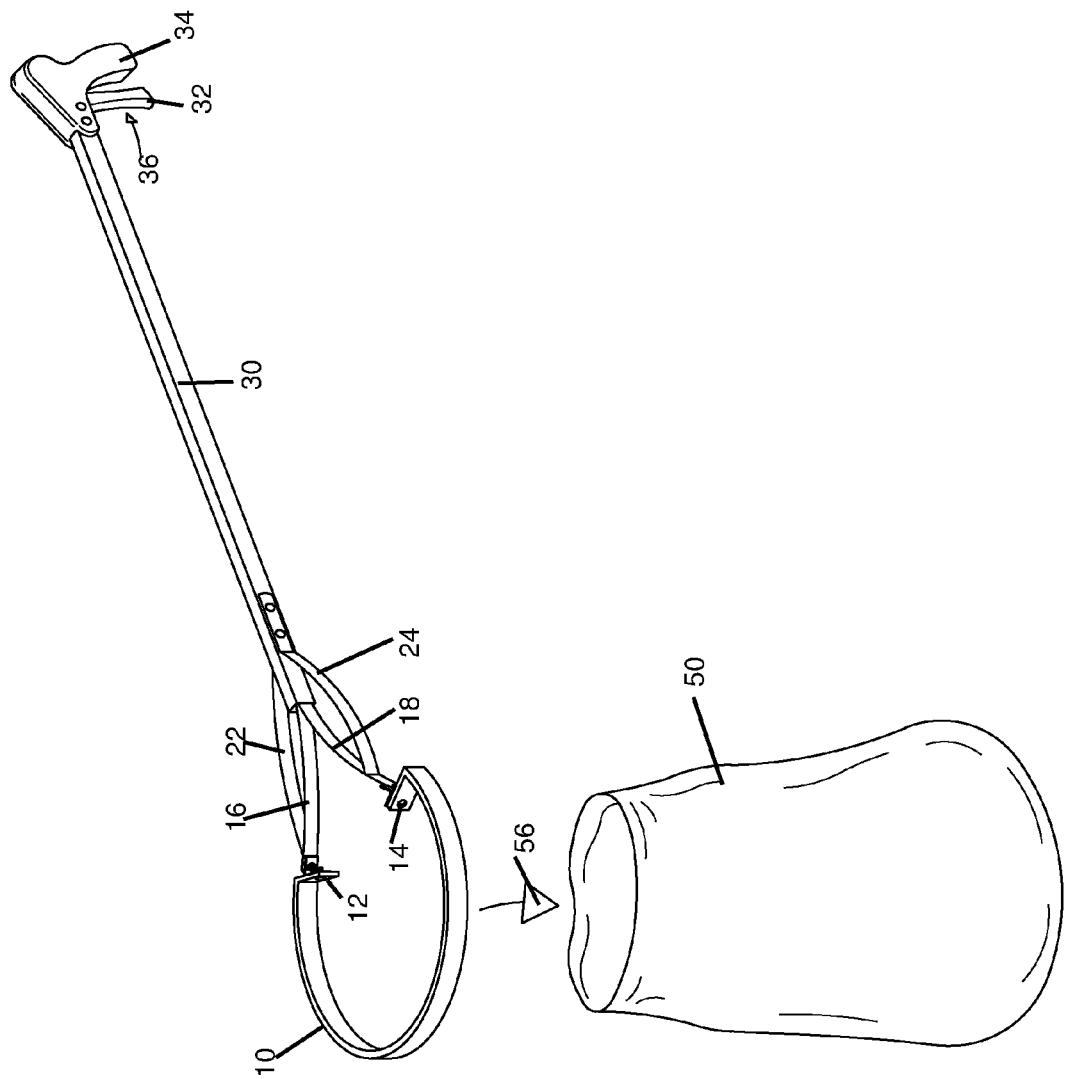
FIG. 4 shows a version of the disjoinable loop with trigger of FIGS. 1 and 2, with a bag fallen from the loop.

FIG. 4 shows a version of the disjoinable loop with trigger of FIGS. 1 and 2, with a bag fallen from the loop. Here, the bag falls from the loop 10 in direction 56, the direction of gravity, due to the change in size of the loop 10. While the figure shows the loop growing in size, it should be understood that decreasing the size of the loop (changing the loop from its disjoined to its joined state) can cause the bag to fall as the loop becomes smaller.

The disjoinable loop shown can be placed under matter which is falling, in order to catch it in the bag 50. For example, an animal defecating might do so into the bag 50, while its owner or caretaker holds the bag there-under. One controls the disjoinable loop by way of holding the handle 34. As such, one can occupy a space distant from the defecation (defined as "at least 2 feet away"), wait until the animal finishes defecating (or other waste falls into the bag 50), and then hold the device over a garbage can or otherwise decide when to release the bag from the loop 10 by using the switch 32.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A disjoinable loop, comprising:
   in a first configuration, a loop which is substantially or fully closed and is fixedly connected at two distinct and separate points to flanges which fixedly attach to an arm, said arm having a handle with switch at an opposite end of said arm from said loop; and
   in a second configuration, said loop being disjoined from itself, and said two distinct and separate points are moved apart from each other;
   wherein depression of said switch causes said loop to change from said first configuration to said second configuration, or said second configuration to said first configuration and
   wherein a majority of said loop is curvilinear, and a minority of said loop is flat and said minority of said loop which is flat comprises a first and a second flat region, which are adjacent to each other in said first configuration, and disjoined from each other in said second configuration.

2. A kit comprising the disjoinable loop of claim 1 and a bag, said bag extending over said loop in said first configuration.

3. The kit of claim 2, wherein, upon the loop changing from said first configuration to said second configuration, or said second configuration to said first configuration, said bag drops from said loop.

4. The disjoinable loop of claim 1, wherein said first flat region is fixedly connected to a first of said two distinct and separate points of said flanges, and said second flat region is fixedly connected to a second of said two distinct and separate points of said flanges.

5. The disjoinable loop of claim 4, wherein a first end of said first and second flange remain in place relative to said arm, when said disjoinable loop changes from said first configuration to said second configuration; and
   a second end of said first and second flanges, opposite said first end, separate from each other when said disjoinable loop changes from said first configuration to said second configuration.

6. The disjoinable loop of claim 1, wherein depressing or releasing said switch causes a bag held by said loop to fall from said disjoinable loop.

7. A disjoinable loop method of use comprising:
   extending a bag over a loop, said loop being fixedly connected to two support flanges, said two support flanges being fixedly connected to an arm at an opposite side from said attachment to said loop, said arm further comprising a switch at a side opposite from a side attached to said two support flanges;
   depressing or releasing said switch, causing said loop to become disjoined and said bag to fall from said loop;
   wherein, when said loop becomes disjoined, said support flanges separate from each other, said support flanges are fixedly connected to flat regions of said loop, and said flat regions become spaced apart upon said loop becoming disjoined.

8. A disjoinable loop, comprising:
   a switch mechanically coupled to two flanges through an arm, said switch operable to separate said two flanges;
   said two flanges fixedly connected to either end of an openable loop, such that operation of said switch causes said loop to open or close;
   wherein said openable loop comprises two flat regions which:
   a) are separated when said loop opens; and
   b) connect to said flanges.

9. A kit comprising said disjoinable loop of claim 8 and a bag extending over a majority of said disjoinable loop.

10. The kit of claim 9, wherein opening said loop causes said bag to fall from said loop.

* * * * *